(12) United States Patent
Guzman et al.

(10) Patent No.: US 11,036,934 B2
(45) Date of Patent: *Jun. 15, 2021

(54) SYSTEM AND METHOD FOR REPORTING BASED ON ELECTRONIC DOCUMENTS

(71) Applicant: Vatbox, Ltd., Herzeliya (IL)

(72) Inventors: Noam Guzman, Ramat Hasharon (IL); Isaac Saft, Kfar Neter (IL)

(73) Assignee: Vatbox, LTD., Herzeliya (IL)

( * ) Notice: Subject to any disclaimer, the term of this patent is extended or adjusted under 35 U.S.C. 154(b) by 331 days.

This patent is subject to a terminal disclaimer.

(21) Appl. No.: 15/669,236

(22) Filed: Aug. 4, 2017

(65) Prior Publication Data

US 2018/0024983 A1 Jan. 25, 2018

Related U.S. Application Data

(63) Continuation-in-part of application No. 15/361,934, filed on Nov. 28, 2016, now abandoned.
(Continued)

(51) Int. Cl.
*G06Q 10/10* (2012.01)
*G06F 40/186* (2020.01)
(Continued)

(52) U.S. Cl.
CPC ........ *G06F 40/186* (2020.01); *G06F 16/5846* (2019.01); *G06F 16/93* (2019.01);
(Continued)

(58) Field of Classification Search
CPC .......... G06F 17/24; G06F 16/93; G06F 16/20; G06K 9/442; G06K 2209/01
See application file for complete search history.

(56) References Cited

U.S. PATENT DOCUMENTS

| 5,606,609 A | 2/1997 | Houser et al. |
| 6,028,970 A | 2/2000 | DiPiazza et al. |

(Continued)

FOREIGN PATENT DOCUMENTS

| EP | 456491 A2 | 11/1991 |
| JP | 2004280274 A | 10/2004 |

(Continued)

OTHER PUBLICATIONS

Stockerl, "Online template matching overa stream of digitized documents", Jun. 2015. (Year: 2015).*

(Continued)

*Primary Examiner* — Kito R Robinson
*Assistant Examiner* — Abdulmajeed Aziz
(74) *Attorney, Agent, or Firm* — M&B IP Analysts (57) ABSTRACT

A system and method for reporting based on a first electronic document and at least one second electronic document. The method includes analyzing the first electronic document to determine at least one transaction parameter for each of at least one expense item, the first electronic document indicating the at least one expense item, wherein the first electronic document includes at least partially unstructured data; creating at least one template for the first electronic document, wherein each first electronic document template is a structured dataset including the determined at least one transaction parameter; retrieving, based on the at least one first electronic document template, the at least one second electronic document; and generating a report when the at least one second electronic document matches the at least one expense item, wherein the report indicates the at least one expense item and includes the at least one second electronic document.

16 Claims, 5 Drawing Sheets

Related U.S. Application Data (60) Provisional application No. 62/371,233, filed on Aug. 5, 2016, provisional application No. 62/260,553, filed on Nov. 29, 2015, provisional application No. 62/261,355, filed on Dec. 1, 2015.

(51) Int. Cl.
*G06K 9/00* (2006.01)
*G06F 16/93* (2019.01)
*G06Q 40/00* (2012.01)
*G06F 16/583* (2019.01)

(52) U.S. Cl.
CPC ..... *G06K 9/00449* (2013.01); *G06K 9/00469* (2013.01); *G06K 9/00483* (2013.01); *G06Q 10/10* (2013.01); *G06Q 40/123* (2013.12); *G06K 2209/01* (2013.01)

(56) References Cited

U.S. PATENT DOCUMENTS

| | | |
|---|---|---|
| 6,343,149 B1 | 1/2002 | Motoiwa |
| 6,499,041 B1 | 12/2002 | Breslau et al. |
| 6,546,373 B1 | 4/2003 | Cerra |
| 7,299,408 B1* | 11/2007 | Daconta ................ G06Q 40/12 715/234 |
| 7,493,322 B2* | 2/2009 | Franciosa ........... G06F 16/3334 |
| 7,693,760 B1 | 4/2010 | Fiteni et al. |
| 7,827,079 B2 | 11/2010 | Feldman et al. |
| 8,046,288 B1 | 10/2011 | LeRoux et al. |
| 8,065,611 B1 | 11/2011 | Chan et al. |
| 8,200,642 B2 | 6/2012 | Maze |
| 8,228,299 B1 | 7/2012 | Maloney et al. |
| 8,386,394 B1 | 2/2013 | Nguyen et al. |
| 8,417,017 B1 | 4/2013 | Beutel et al. |
| 8,438,089 B1 | 5/2013 | Wasserblat et al. |
| 8,447,111 B2 | 5/2013 | King et al. |
| 8,639,062 B2 | 1/2014 | Calman et al. |
| 8,798,354 B1 | 8/2014 | Bunzel et al. |
| 8,813,178 B1 | 8/2014 | Khanna |
| 8,890,978 B1 | 11/2014 | Madhani et al. |
| 8,996,350 B1 | 3/2015 | Dub et al. |
| 9,002,838 B2 | 4/2015 | Pitzo et al. |
| 9,141,607 B1 | 9/2015 | Lee et al. |
| 9,158,833 B2 | 10/2015 | Urbschat et al. |
| 9,824,270 B1* | 11/2017 | Mao ....................... G06K 9/033 |
| 2001/0049680 A1 | 12/2001 | Yanagimoto |
| 2002/0091671 A1 | 7/2002 | Prokoph |
| 2002/0138467 A1 | 9/2002 | Jacobson et al. |
| 2003/0088562 A1 | 5/2003 | Dillon et al. |
| 2003/0163778 A1 | 8/2003 | Shores et al. |
| 2003/0212617 A1 | 11/2003 | Stone et al. |
| 2004/0010451 A1 | 1/2004 | Romano et al. |
| 2004/0034554 A1 | 2/2004 | Shirley et al. |
| 2004/0181749 A1 | 9/2004 | Chellapilla et al. |
| 2004/0267620 A1 | 12/2004 | Feldman et al. |
| 2005/0165623 A1 | 7/2005 | Landi et al. |
| 2005/0273614 A1 | 12/2005 | Ahuja et al. |
| 2006/0004814 A1 | 1/2006 | Lawrence et al. |
| 2006/0219773 A1 | 10/2006 | Richardson |
| 2007/0050356 A1 | 3/2007 | Amadio |
| 2007/0168382 A1 | 7/2007 | Tillberg et al. |
| 2007/0237427 A1 | 10/2007 | Patel et al. |
| 2007/0250416 A1 | 10/2007 | Beach et al. |
| 2008/0072140 A1* | 3/2008 | Vydiswaran .......... G06F 16/355 715/243 |
| 2008/0079979 A1 | 4/2008 | Holt et al. |
| 2008/0082374 A1 | 4/2008 | Kennis et al. |
| 2008/0126155 A1 | 5/2008 | Xu et al. |
| 2008/0183523 A1 | 7/2008 | Dikeman |
| 2008/0219543 A1 | 9/2008 | Csulits et al. |
| 2008/0229187 A1 | 9/2008 | Mahoney et al. |
| 2009/0063470 A1 | 3/2009 | Peled et al. |
| 2009/0112743 A1 | 4/2009 | Mullins et al. |
| 2009/0171958 A1 | 7/2009 | Anderson |
| 2009/0192978 A1 | 7/2009 | Hewett et al. |
| 2009/0228294 A1 | 9/2009 | Choi et al. |
| 2010/0070562 A1 | 3/2010 | Boyer et al. |
| 2010/0106544 A1 | 4/2010 | Frost et al. |
| 2010/0161616 A1* | 6/2010 | Mitchell ................. G06F 16/22 707/741 |
| 2010/0182631 A1 | 7/2010 | King et al. |
| 2010/0211609 A1 | 8/2010 | Xiong et al. |
| 2010/0220929 A1 | 9/2010 | Misawa et al. |
| 2011/0016043 A1 | 1/2011 | Dornseif |
| 2011/0093471 A1 | 4/2011 | Brockway et al. |
| 2011/0138175 A1 | 6/2011 | Clark et al. |
| 2011/0182500 A1* | 7/2011 | Esposito ............. G06F 3/04886 382/159 |
| 2011/0255784 A1 | 10/2011 | Welling et al. |
| 2012/0027246 A1 | 2/2012 | Tifford et al. |
| 2012/0078768 A1 | 3/2012 | King et al. |
| 2012/0133989 A1 | 5/2012 | Glover |
| 2012/0221448 A1 | 8/2012 | Evans et al. |
| 2013/0051671 A1* | 2/2013 | Barton ..................... G06T 7/12 382/173 |
| 2013/0179314 A1 | 7/2013 | Stoke et al. |
| 2013/0282725 A1 | 10/2013 | Rubinger |
| 2013/0291127 A1 | 10/2013 | Bergman et al. |
| 2014/0006234 A1 | 1/2014 | Geisau et al. |
| 2014/0067633 A1 | 3/2014 | Venkatasubramanian et al. |
| 2014/0079294 A1* | 3/2014 | Amtrup ................. G06Q 20/10 382/112 |
| 2014/0129400 A1* | 5/2014 | Armstrong ............. G06Q 30/04 705/34 |
| 2014/0153830 A1 | 6/2014 | Amtrup et al. |
| 2014/0207634 A1 | 7/2014 | Edmonds |
| 2014/0244458 A1 | 8/2014 | Saft et al. |
| 2014/0344576 A1 | 11/2014 | Johnson |
| 2015/0012339 A1 | 1/2015 | Onischuk |
| 2015/0019409 A1 | 1/2015 | Vagiri |
| 2015/0019586 A1 | 1/2015 | Raichelgauz et al. |
| 2015/0026556 A1 | 1/2015 | Stadermann et al. |
| 2015/0040002 A1 | 2/2015 | Kannan et al. |
| 2015/0106247 A1 | 4/2015 | Saft et al. |
| 2015/0127534 A1 | 5/2015 | Bhambhani |
| 2015/0235301 A1 | 8/2015 | Brady et al. |
| 2015/0242832 A1 | 8/2015 | Corritori et al. |
| 2015/0248657 A1 | 9/2015 | Loock et al. |
| 2015/0302154 A1 | 10/2015 | Brooks |
| 2015/0324767 A1 | 11/2015 | Walsh et al. |
| 2015/0332283 A1 | 11/2015 | Witchey |
| 2015/0356174 A1 | 12/2015 | Narayana et al. |
| 2015/0356545 A1 | 12/2015 | Marcuccilli et al. |
| 2015/0363893 A1 | 12/2015 | Saft et al. |
| 2015/0370460 A1 | 12/2015 | Lu |
| 2015/0378972 A1* | 12/2015 | Kapadia ............... G06F 16/955 715/229 |
| 2015/0379346 A1 | 12/2015 | Newcomer et al. |
| 2016/0042471 A1 | 2/2016 | Barrett et al. |
| 2017/0147540 A1 | 5/2017 | McCormick et al. |
| 2017/0308517 A1 | 10/2017 | Josifovski et al. |
| 2017/0351968 A1 | 12/2017 | Bowers et al. |
| 2018/0012268 A1 | 1/2018 | Simantov et al. |
| 2019/0236128 A1* | 8/2019 | Guzman ............. G06F 16/245 |
| 2019/0236347 A1* | 8/2019 | Guzman .......... G06F 16/90332 |
| 2019/0244048 A1* | 8/2019 | Saft .................... G06K 9/00422 |

FOREIGN PATENT DOCUMENTS

| | | |
|---|---|---|
| JP | 2008167009 A | 7/2008 |
| JP | 2009157592 A | 7/2009 |
| JP | 2013016097 A | 1/2013 |
| WO | 2010143001 A1 | 12/2010 |
| WO | 2013048790 A1 | 4/2013 |
| WO | 2014132256 A1 | 9/2014 |
| WO | 2016115207 A1 | 7/2016 |

OTHER PUBLICATIONS

The International Search Report and The Written Opinion for PCT/US2017/045488, ISA/RU, Moscow, RU, dated Jan. 11, 2018.

(56) References Cited

OTHER PUBLICATIONS

The International Search Report and The Written Opinion for PCT/US2017/055135, ISA/RU, Moscow, RU, dated Jan. 25, 2018.
The International Search Report and the Written Opinion of PCT/US2017/045333, ISA/RU, Moscow, Russia, dated Dec. 28, 2017.
The International Search Report and the Written Opinion of PCT/US2017/045497, ISA/RU, Moscow, Russia, dated Dec. 14, 2017.
The International Search Report and the Written Opinion of the International Searching Authority for PCT/US2016/067716, ISA/RU, Moscow, Russia, dated Jul. 20, 2017.
The International Search Reort and the Written Opinion of the International Searching Authority for PCT/US2017/032854, ISA/RU, Moscow, Russia, dated Oct. 12, 2017.
The International Search Reort and the Written Opinion of the International Searching Authority for PCT/US2017/032855, ISA/RU, Moscow, Russia, dated Oct. 19, 2017.
The International Search Report and the Written Opinion of the International Searching Authority for PCT/US2017/033106, ISA/RU, Moscow, Russia, dated Oct. 12, 2017.
The International Search Report and the Written Opinion of the International Searching Authority for PCT/US2017/033338, ISA/RU, Moscow, Russia, dated Oct. 26, 2017.
The International Search Report and The Written Opinion of The International Searching Authority for PCT/US2017/043644, ISA/RU, Moscow, Russia, dated Dec. 28, 2017.
The International Search Report and The Written Opinion of The International Searching Authority for PCT/US2017/045338, ISA/RU, Moscow, Russia, dated Dec. 28, 2017.
The International Search Report and The Written Opinion of The International Searching Authority for PCT/US2017/045342, ISA/RU, Moscow, Russia, dated Dec. 28, 2017.
The International Search Report and The Written Opinion of The International Searching Authority for PCT/US2017/045491, ISA/RU, Moscow, Russia, dated Dec. 28, 2017.
The International Search Report and The Written Opinion of The International Searching Authority for PCT/US2017/045554, ISA/RU, Moscow, Russia, dated Dec. 28, 2017.
The International Search Report and The Written Opinion of The International Searching Authority for PCT/US2017/046317, ISA/RU, Moscow, Russia, dated Dec. 28, 2017.
The International Search Report and The Written Opinion of The International Searching Authority for PCT/US2017/056448, ISA/RU, Moscow, Russia, dated Jan. 25, 2018.
A Non-Final Office Action for U.S. Appl. No. 15/013,284 dated Apr. 4, 2017.
The International Search Report and the Written Opinion for PCT/US2016/016104, ISA/RU, Moscow, Russia, dated Apr. 14, 2016.
The International Search Report and The Written Opinion for PCT/US2016/063828, ISA/RU, Moscow, Russia, dated Apr. 13, 2017.
The International Search Report and the Written Opinion for PCT/US2016/066845, ISA/RU, Moscow, Russia, dated May 25, 2017.
The International Search Report and The Written Opinion for PCT/US2016/068536, ISA/RU, Moscow, Russia, dated Apr. 13, 2017.
The International Search Report and the Written Opinion for PCT/US2016/068714, ISA/RU, Moscow, Russia, dated May 11, 2017.
The International Search Report and the Written Opinion for PCT/US2017/012120, ISA/RU, Moscow, Russia, dated May 18, 2017.
The International Search Report and the Written Opinion for PCT/US2017/014874, ISA/RU, Moscow, Russia, dated May 18, 2017.
The International Search Report and the Written Opinion for PCT/US2017/015087, ISA/RU, Moscow, Russia, dated Jan. 26, 2017.
The European Search Reort for European Application No. 16890887.9, dated Jun. 5, 2019, EPO, Munich, Germany.
The European Search Report for 16869348.9 dated Apr. 2, 2019, EPO, Munich, Germany.
The International Search Report and the Written Opinion for PCT/US2017/064191, dated Feb. 28, 2018, ISA/RU, Moscow, Russia.
The European Search Report for EP Application 17767105.4, dated Sep. 9, 2019, EPO, Munich, Germany.
The European Search Report for EP Application No. 16894794.3, The European Patent Office, The Hague, Date of Completion: Aug. 16, 2019.
The European Search Report for European Application No. 17799796.2, dated Oct. 7, 2019, EPO, Munich, Germany.
The First Office Action for Japanese Patent Application No. 2016-574128, dated Oct. 8, 2019, Japanese Patent Office, Tokyo, Japan.
The European Search Report for EP Application No. 17837704.0, The European Patent Office, The Hague: dated Jan. 29, 2020.
The European Search Report for EP Application No. 17837759.4, The European Patent Office, The Hague, dated Jan. 29, 2020.
The European Search Report for European Patent Application No. 17767105.4, dated Sep. 9, 2019, EPO, Munich, Germany.
The European Search Report for European Patent Application No. 17840055.2, dated Mar. 17, 2020, Munich, Germany.
Notice of Deficiencies for European Patent Application No. 17 837 759.4, dated Jan. 28, 2021, EPO, Rijswijk, The Netherlands.

\* cited by examiner

SYSTEM AND METHOD FOR REPORTING BASED ON ELECTRONIC DOCUMENTS

CROSS-REFERENCE TO RELATED APPLICATIONS

This application claims the benefit of U.S. Provisional Application No. 62/371,233 filed on Aug. 5, 2016. This application is also a continuation-in-part of U.S. patent application Ser. No. 15/361,934 filed on Nov. 28, 2016, now pending, which claims the benefit of U.S. Provisional Application No. 62/260,553 filed on Nov. 29, 2015, and of U.S. Provisional Application No. 62/261,355 filed on Dec. 1, 2015. The contents of the above-referenced applications are hereby incorporated by reference.

TECHNICAL FIELD

The present disclosure relates generally to analyzing electronic documents, and more particularly to contextually analyzing unstructured electronic documents.

BACKGROUND

Customers can place orders for services such as travel and accommodations from merchants in real-time over the web. These orders can be received and processed immediately. However, payments for the orders typically require more time to complete and, in particular, to secure the money being transferred. Therefore, merchants typically require the customer to provide assurances of payment in real-time while the order is being placed. As an example, a customer may input credit card information pursuant to a payment, and the merchant may verify the credit card information in real-time before authorizing the sale. The verification typically includes determining whether the provided information is valid (i.e., that a credit card number, expiration date, PIN code, and/or customer name match known information).

Upon receiving such assurances, a purchase order may be generated for the customer. The purchase order provides evidence of the order such as, for example, a purchase price, goods and/or services ordered, and the like. Later, an invoice for the order may be generated. While the purchase order is usually used to indicate which products are requested and an estimate or offering for the price, the invoice is usually used to indicate which products were actually provided and the final price for the products. Frequently, the purchase price as demonstrated by the invoice for the order is different from the purchase price as demonstrated by the purchase order. As an example, if a guest at a hotel initially orders a 3-night stay but ends up staying a fourth night, the total price of the purchase order may reflect a different total price than that of the subsequent invoice. Cases in which the total price of the invoice is different from the total price of the purchase order are difficult to track, especially in large enterprises accepting many orders daily (e.g., in a large hotel chain managing hundreds or thousands of hotels in a given country). The differences may cause errors in recordkeeping for enterprises.

As businesses increasingly rely on technology to manage data related to operations such as invoice and purchase order data, suitable systems for properly managing and validating data have become crucial to success. Particularly for large businesses, the amount of data utilized daily by businesses can be overwhelming. Accordingly, manual review and validation of such data is impractical, at best. However, disparities between recordkeeping documents can cause significant problems for businesses such as, for example, failure to properly report earnings to tax authorities.

Some solutions exist for automatically recognizing information in scanned documents (e.g., invoices and receipts) or other unstructured electronic documents (e.g., unstructured text files). Such solutions often face challenges in accurately identifying and recognizing characters and other features of electronic documents. Moreover, degradation in content of the input unstructured electronic documents typically result in higher error rates. As a result, existing image recognition techniques are not completely accurate under ideal circumstances (i.e., very clear images), and their accuracy often decreases dramatically when input images are less clear. Moreover, missing or otherwise incomplete data can result in errors during subsequent use of the data. Many existing solutions cannot identify missing data unless, e.g., a field in a structured dataset is left incomplete.

In addition, existing image recognition solutions may be unable to accurately identify some or all special characters (e.g., "!," "@," "#," "$," "©," "%," "&," etc.). As an example, some existing image recognition solutions may inaccurately identify a dash included in a scanned receipt as the number "1." As another example, some existing image recognition solutions cannot identify special characters such as the dollar sign, the yen symbol, etc.

Further, such solutions may face challenges in preparing recognized information for subsequent use. Specifically, many such solutions either produce output in an unstructured format, or can only produce structured output if the input electronic documents are specifically formatted for recognition by an image recognition system. The resulting unstructured output typically cannot be processed efficiently. In particular, such unstructured output may contain duplicates, and may include data that requires subsequent processing prior to use.

When an employee seeks reimbursement for expenses made on behalf of the business, the employee may submit an expense report including information related to the expenses. In order for the business to deduct expenses or reclaim value-added taxes paid for the expenses, businesses typically require employees to also submit appropriate evidence of the expenses such as receipts or invoices. Matching expense reports to appropriate evidences is critical for businesses to deduct or reclaim taxes.

Often, when employees of businesses submit expense reports documenting expenses that they should be compensated for, the expense indicated in the report are not associated with the corresponding evidencing documents (e.g., receipts, invoices, etc.) proving that the expenses were made. This issue is further compounded when an employee submits an expense report related to multiple transactions. For example, a single expense of USD 600 mentioned in an expense report may refer to an accommodation expense, but in reality, the USD 600 was spent over the course of 3 different hotel stays costing USD 200 each.

Some solutions for managing expense reports for different transactions exist, but such solutions typically require the expense report to be in a known structured format or submitting separate expense reports for different transactions. These solutions therefore face additional challenges when the expense reports themselves are unstructured or lacking a known structure, for example, when an employee fills out an expense report by hand and scans the completed expense report.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein method for reporting based on a first electronic document and at least one second electronic document. The method comprises: analyzing the first electronic document to determine at least one transaction parameter for each of at least one expense item, the first electronic document indicating the at least one expense item, wherein the first electronic document includes at least partially unstructured data; creating at least one template for the first electronic document, wherein each first electronic document template is a structured dataset including the determined at least one transaction parameter; retrieving, based on the at least one first electronic document template, the at least one second electronic document; and generating a report when the at least one second electronic document matches the at least one expense item, wherein the report indicates the at least one expense item and includes the at least one second electronic document.

Certain embodiments disclosed herein also include a non-transitory computer readable medium having stored thereon instructions for causing a processing circuitry to perform a process for reporting based on a first electronic document and at least one second electronic document, the process comprising: analyzing the first electronic document to determine at least one transaction parameter for each of at least one expense item, the first electronic document indicating the at least one expense item, wherein the first electronic document includes at least partially unstructured data; creating at least one template for the first electronic document, wherein each first electronic document template is a structured dataset including the determined at least one transaction parameter; retrieving, based on the at least one first electronic document template, the at least one second electronic document; and generating a report when the at least one second electronic document matches the at least one expense item, wherein the report indicates the at least one expense item and includes the at least one second electronic document.

Certain embodiments disclosed herein also include a system for reporting based on a first electronic document and at least one second electronic document. The system comprises: a processing circuitry; and a memory, the memory containing instructions that, when executed by the processing circuitry, configure the system to: analyze the first electronic document to determine at least one transaction parameter for each of at least one expense item, the first electronic document indicating the at least one expense item, wherein the first electronic document includes at least partially unstructured data; create at least one template for the first electronic document, wherein each first electronic document template is a structured dataset including the determined at least one transaction parameter; retrieve, based on the at least one first electronic document template, the at least one second electronic document; and generate a report when the at least one second electronic document matches the at least one expense item, wherein the report indicates the at least one expense item and includes the at least one second electronic document.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for reporting based on electronic documents. In an embodiment, a dataset is created based on data extracted from a first expense report electronic document indicating information related to one or more expense items. A template of transaction attributes is created based on the expense report electronic document dataset. Each template includes transaction parameters for a transaction and, more specifically, may include data related to an expense item. In an example implementation, each template may include, but is not limited to, a transaction amount (e.g., a price) and a transaction description. A search is performed to find one or more second evidencing electronic document for based on the created templates.

The templates are compared to data of the evidencing electronic documents. Based on the comparison, it is determined whether the expense items indicated in the templates match the evidencing electronic documents above a predetermined threshold. When it is determined that the evidencing electronic documents match the expense items, a report including the templates and the matching evidencing electronic documents is generated.

In some implementations, the reporting may be performed inversely with respect to the expense report electronic document and the evidencing electronic documents. That is, in some embodiments, templates may be one or more first evidencing electronic documents as described herein and utilized to search for a second expense report electronic document and to compare data of the expense report electronic document to data of the created templates to determine if the expense report electronic document matches the templates above a predetermined threshold and, if so, to generate a report including the evidencing electronic documents and the templates.

The disclosed embodiments allow for automatic retrieval of documents providing evidentiary proof of transactions indicated in expense reports as well as automatic retrieval of expense reports indicating expenses included in evidencing electronic documents such that the transactions and corresponding documents are indicated in the same report. More specifically, the disclosed embodiments include providing structured dataset templates for electronic documents, thereby allowing for efficiently and accurately comparing data from corresponding portions of electronic documents that are unstructured, semi-structured, or otherwise lacking a known structure. For example, the disclosed embodiments may be used to effectively analyze images showing scanned expense reports and receipts.

Figure 1:
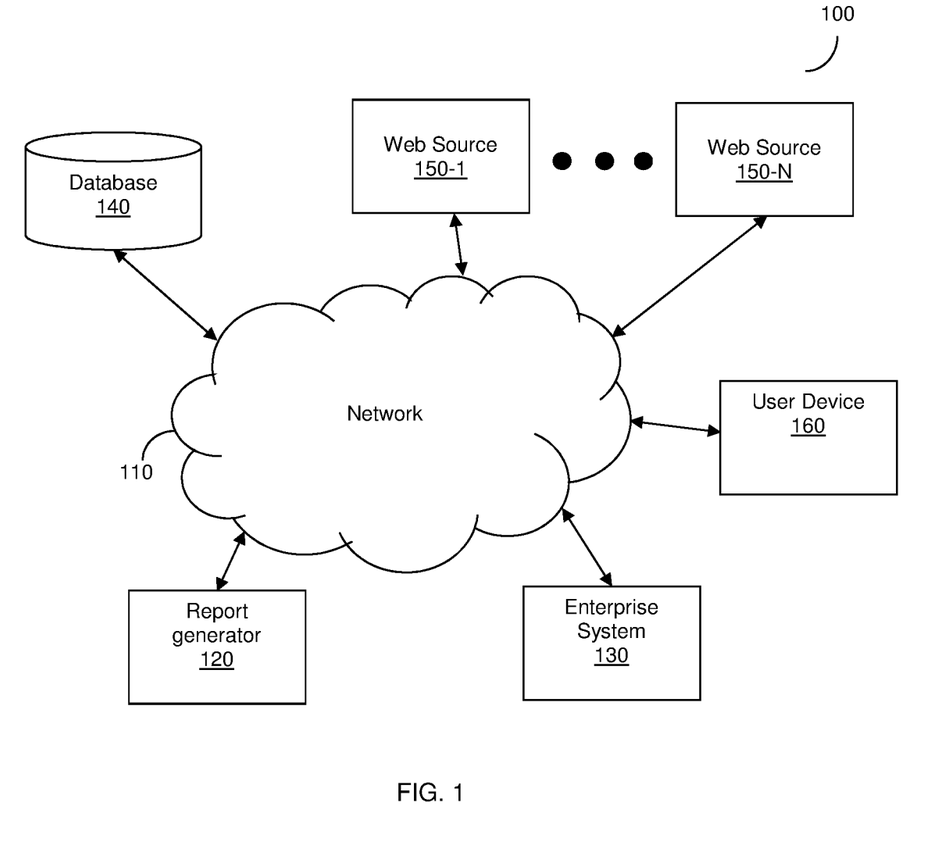
FIG. 1 is a network diagram utilized to describe the various disclosed embodiments.

FIG. 1 shows an example network diagram 100 utilized to describe the various disclosed embodiments. In the example network diagram 100, a report generator 120, an enterprise system 130, a database 140, a plurality of web sources 150-1 through 150-N (hereinafter referred to individually as a web source 150 and collectively as web sources 150, merely for simplicity purposes), and a user device 160, are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The enterprise system 130 is associated with an enterprise, and may store data related to purchases made by the enterprise or representatives of the enterprise as well as data related to the enterprise itself. The enterprise may be, but is not limited to, a business whose employees may purchase goods and services on behalf of the business and, accordingly, may seek to be refunded by submitting expense reports describing the expenses to be refunded. The enterprise system 130 may be, but is not limited to, a server, a database, an enterprise resource planning system, a customer relationship management system, or any other system storing relevant data.

The data stored by the enterprise system 130 may include, but is not limited to, electronic documents (e.g., an image file showing, for example, a scan of an invoice, a text file, a spreadsheet file, etc.). Each electronic document may show, e.g., an expense report, an invoice, a tax receipt, a purchase number record, and the like. Data included in each electronic document may be structured, semi-structured, unstructured, or a combination thereof. The structured or semi-structured data may be in a format that is not recognized by the report generator 120 and, therefore, may be treated as unstructured data.

The database 140 may store reports generated by the report generator 120. Such reports may include, e.g., templates including data of expense items and associated evidencing electronic documents.

The web sources 150 store at least electronic documents that may be utilized as evidence for granting requests. The web sources 150 may include, but are not limited to, servers or devices of merchants, tax authority servers, accounting servers, a database associated with an enterprise, and the like. As a non-limiting example, the web source 150-1 may be a merchant server storing image files showing invoices for transactions made by a merchant associated with the merchant server.

The user device 160 may be, but is not limited to, a personal computer (PC), a personal digital assistant (PDA), a mobile phone, a smart phone, a tablet computer, a wearable computing device and other kinds of wired and mobile appliances. The user device 160 may be configured to store electronic documents such as images showing expense reports, scanned invoices, and the like.

In an embodiment, the report generator 120 is configured to create a template based on transaction parameters identified using machine vision of each of one or more first electronic documents indicating information related to one or more transactions. The report generator 120 may be configured to, e.g., retrieve the first electronic documents from the enterprise system 130, or to receive the first electronic documents from the user device 160. Based on the created templates, the report generator 120 is configured to search for one or more second electronic documents. Data of the second electronic documents is compared to the templates to determine whether there is a match and, if so, a report is generated including the templates and the first electronic documents, the second electronic documents, or both.

Each electronic document includes data related to one or more transactions. The transaction-related data may include, but it not limited to, description, type of expense, date, time, amount (e.g., price per unit or total price), other expenses, paying entity, seller entity, and the like. Example transaction descriptions include "taxi," "accommodation," "restaurant," and the like. Each electronic document may further include document identifying data such as, but not limited to, a document identification number (e.g., an identification number for an invoice), a submitting entity identifier (e.g., a name or identification number of an employee submitting the expense report), and the like.

In an example implementation, the first electronic documents include an expense report electronic document indicating one or more expense items for which an employee seeks compensation and the second electronic documents include a corresponding evidencing electronic document for each indicated expense item. In another example implementation, the first electronic documents include one or more evidencing electronic documents providing evidence of transactions and the second electronic documents include an expense report electronic document indicating each transaction illustrated in the evidencing electronic documents.

In an embodiment, the report generator 120 is configured to create templates using datasets based on electronic documents including data at least partially lacking a known structure (e.g., unstructured data, semi-structured data, or structured data having an unknown structure). To this end, the report generator 120 may be further configured to utilize optical character recognition (OCR) or other image processing to determine data in the electronic document. The report generator may therefore include or be communicatively connected to a recognition processor (e.g., the recognition processor 235, FIG. 2).

In an embodiment, the report generator 120 is configured to analyze the created datasets to identify transaction parameters related to transactions indicated in the first electronic documents. In an embodiment, the report generator 120 is configured to create templates based on the created datasets. Each template is a structured dataset including the identified transaction parameters for one of the transactions. In an example implementation, each template includes at least a field and a value for an expense amount (e.g., a price of a transaction) and an expense description.

Using structured templates for determining matching electronic documents allows for more efficient and accurate determination than, for example, by utilizing unstructured data. Specifically, data of expense reports may be compared to corresponding data of evidencing documents with respect to fields of the templates, thereby reducing the number of comparisons as well as reducing false positives due to comparing data that is likely unrelated to each other. Further, data extracted from electronic documents and organized into templates requires less memory than, for example, images of scanned documents.

In an embodiment, based on the templates, the report generator 120 is configured to search in the web sources 150 for one or more second electronic documents. The searching may include querying the web sources based on one or more transaction parameters included in each template, and may further include utilizing transaction parameters in one or more predetermined fields to be searched, for example, a combination of fields that uniquely identifies an expense. For example, the search may be based on data in "date" and "description" fields of the templates. The search results in one or more second electronic documents.

In an embodiment, the search may only be performed based on some of the created templates. Specifically, the search may exclude use of templates that have been previously reported. Alternatively, the report generator 120 may be configured to compare a uniquely identifying set of transaction parameters for of template to corresponding sets of transaction parameters of templates having metadata marking the expense item indicated in the template as previously utilized. Excluding previously utilized expense items from searching prevents or mitigates double reporting the same expense item. As an example, if an expense report electronic document includes transaction identification numbers "1234" and "5678" for purchases having descriptions "food" and "hotel stay," respectively, when a template including the transaction identification number "5678" and the description "hotel stay" has metadata marking the expense item as utilized, the search may be based only on the template including the transaction parameters "1234" and "food."

In an embodiment, the report generator 120 is configured to compare the created templates of the first electronic documents to data of the second electronic documents found during the search with respect to at least the amount and description transaction parameters in order to determine whether the second electronic documents match the templates, e.g., above a predetermined threshold. The matching may be further based on one or more matching rules establishing matching values (e.g., a description of "hotel" may be considered to match a description of "accommodations," amounts within USD 5 of each other may be considered to match, etc.). For example, if the first electronic document is an expense report indicating an expense amount of "USD 600" with an expense description of "restaurants," these transaction parameters may be compared to the amount and description, respectively, indicated in each of 6 invoices found during the search. As an example, each invoice has an amount value of USD 100 and a description of "restaurant," "restaurant bar," or "food." Because the total amount of the invoices and the description of each invoice matches the amount and description of the expense report, it is determined that the invoices match the templates.

In an embodiment, the comparison may further include creating one or more templates for each of the second electronic documents, and comparing data in the first electronic document templates to data in corresponding fields of the second electronic document templates. The templates may be created for the second electronic documents when the second electronic documents are at least partially unstructured, thereby allowing for more accurate and efficient comparisons. For example, if the electronic documents are images showing scanned invoices, the data therein is unstructured.

In an embodiment, the report generator 120 is configured to generate a report when it is determined that the first electronic documents match the second electronic documents above a predetermined threshold. Each report may indicate each searched expense item and may include, for example, one or more corresponding evidencing electronic documents of each searched expense item. The reports may further include the template of each expense item.

In an embodiment, when a report is generated, the report generator 120 is configured to mark each expense item indicated in the report as a utilized expense item. The marking may include, but is not limited to, planting a code on each utilized expense item. For example, the marking code may be included in metadata of the template indicating the expense item. The marking may be utilized as described herein above to identify previously utilized expense items that should not be searched, thereby conserving computing resources and increasing accuracy of reporting data by reducing instances of incorrect or double reporting of an expense item.

It should be noted that the embodiments described herein above with respect to FIG. 1 are described with respect to one enterprise system 130 merely for simplicity purposes and without limitation on the disclosed embodiments. Multiple enterprise systems may be equally utilized without departing from the scope of the disclosure.

Figure 2:
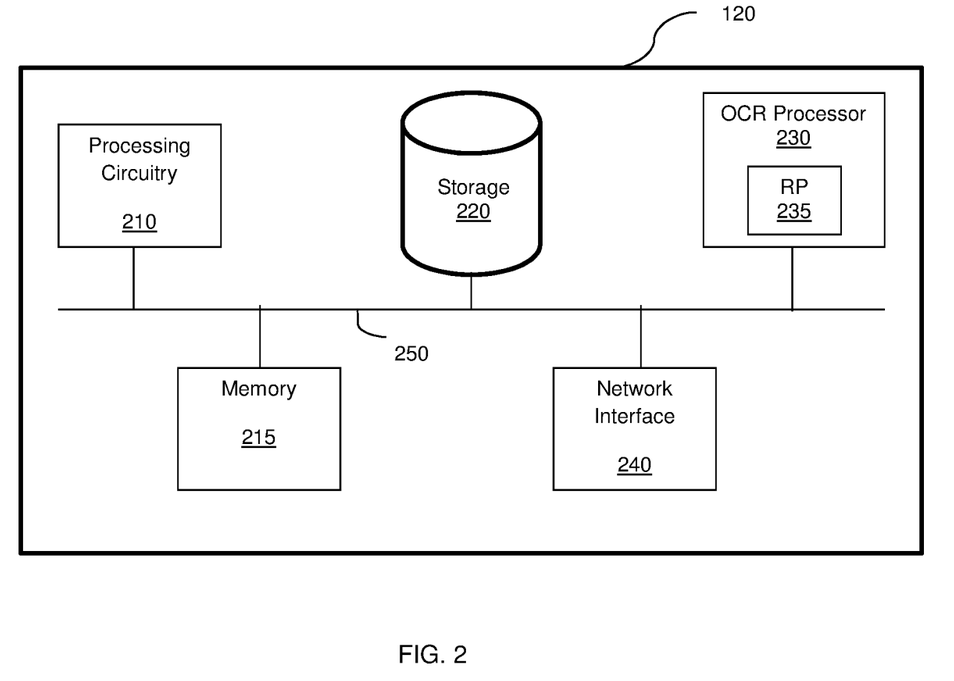
FIG. 2 is a schematic diagram of a validation system according to an embodiment.

FIG. 2 is an example schematic diagram of the report generator 120 according to an embodiment. The report generator 120 includes a processing circuitry 210 coupled to a memory 215, a storage 220, and a network interface 240. In an embodiment, the report generator 120 may include an optical character recognition (OCR) processor 230. In another embodiment, the components of the report generator 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to generate reports based on electronic documents, as discussed herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The OCR processor 230 may include, but is not limited to, a feature and/or pattern recognition processor (RP) 235 configured to identify patterns, features, or both, in unstructured data sets. Specifically, in an embodiment, the OCR processor 230 is configured to identify at least characters in the unstructured data. The identified characters may be utilized to create a dataset including data required for verification of a request.

The network interface 240 allows the report generator 120 to communicate with the enterprise system 130, the database 140, the web sources 150, or a combination of, for the purpose of, for example, collecting metadata, retrieving data, storing data, and the like.

It should be understood that the embodiments described herein are not limited to the specific architecture illustrated in FIG. 2, and other architectures may be equally used without departing from the scope of the disclosed embodiments.

Figure 3:
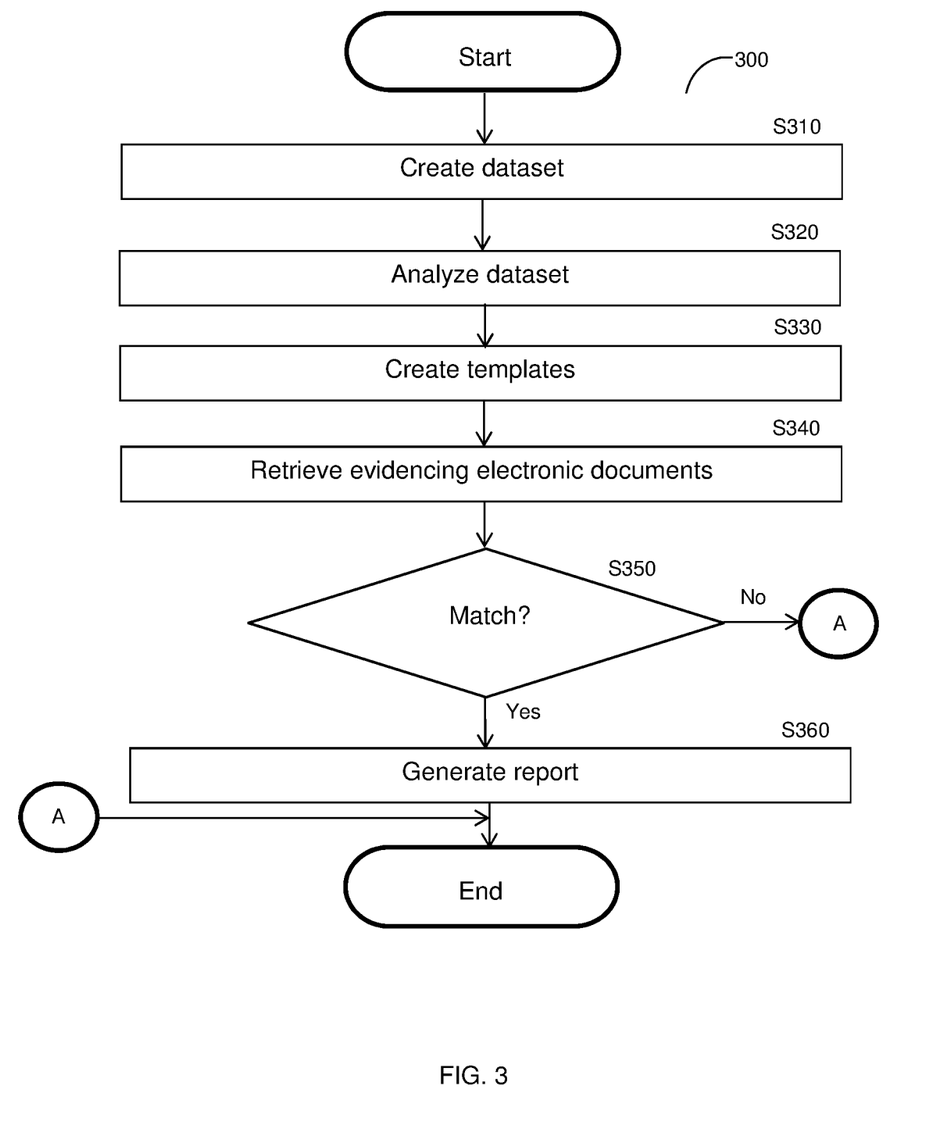
FIG. 3 is a flowchart illustrating a method for reporting based on electronic documents according to an embodiment.

FIG. 3 is an example flowchart 300 illustrating a method for reporting based on electronic documents according to an embodiment. In an embodiment, the method may be performed by a report generator (e.g., the report generator 120). In an example implementation, the method includes reporting expense items indicated in a first expense report electronic document and in one or more second evidencing electronic documents.

At S310, a dataset is created based on the expense report electronic document including information related to at least one expense item. The expense report electronic document may include, but is not limited to, unstructured data, semi-structured data, structured data with structure that is unanticipated or unannounced, or a combination thereof. In an embodiment, S310 may further include analyzing the expense report electronic document using optical character recognition (OCR) to determine data in the electronic document, identifying key fields in the data, identifying values in the data, or a combination thereof. Creating datasets based on electronic documents is described further herein below with respect to FIG. 4.

At S320, the expense report dataset is analyzed. In an embodiment, analyzing the expense report dataset may include, but is not limited to, determining transaction parameters such as, but not limited to, at least one entity identifier (e.g., a consumer enterprise identifier, a merchant enterprise identifier, or both), information related to the transaction (e.g., a date, a time, a price, a type of good or service sold, etc.), or both. In a further embodiment, analyzing the expense report dataset may also include identifying the transaction based on the expense report dataset.

At S330, one or more templates is created based on the expense report dataset. Each template may be, but is not limited to, a data structure including a plurality of fields. The fields may include the identified transaction parameters. The fields may be predefined. Each template may include transaction parameters indicating a distinct expense item included in the expense report.

Creating templates from electronic documents allows for faster processing due to the structured nature of the created templates. For example, query and manipulation operations may be performed more efficiently on structured datasets than on datasets lacking such structure. Further, organizing information from electronic documents into structured datasets, the amount of storage required for saving information contained in electronic documents may be significantly reduced. Electronic documents are often images that require more storage space than datasets containing the same information. For example, datasets representing data from 100,000 image electronic documents can be saved as data records in a text file. A size of such a text file would be significantly less than the size of the 100,000 images.

At S340, the evidencing electronic documents are retrieved based on the templates of the expense report electronic document. In an embodiment, S340 includes searching, based on transaction parameters in the expense report template, in one or more web sources. As a non-limiting example, a transaction identification number "123456789" indicated in a "Transaction ID" field of the first template may be utilized as a search query to find an evidencing electronic document based on, e.g., metadata of the evidencing electronic document including the transaction identification number "123456789." In a further embodiment, S340 further includes selecting the at least one web source based on the expense report template (e.g., a web source of a particular merchant may be selected based on a merchant identifier in the template).

In an embodiment, S340 may further include determining which templates to be utilized for the search. Specifically, only some of the templates may be utilized when, for example, one or more of the templates indicates a previously utilized expense item. For example, if an employee has previously reported the expense item, that expense item may be excluded from the search such that it is not reported twice. The excluded templates may be determined by, e.g., comparing the templates to previously created templates, where each compared previously created template includes metadata marking the expense item of the template as utilized.

At S350, the expense report templates utilized for the search are compared to data of the retrieved evidencing electronic documents to determine whether the respective expense items match the evidencing electronic documents and, if so, execution continues with S360; otherwise, execution terminates. In an embodiment, the comparison may be based on a predetermined threshold with respect to one or more transaction parameters. The comparison may be further based on one or more matching rules defining matching parameters. In an example implementation, the comparison is performed at least with respect to at least the expense amount and expense description values.

In an embodiment, S350 may further include creating a template for each evidencing electronic document and comparing transaction parameters in fields of the expense report templates to transaction parameters in corresponding fields of the evidencing templates. The templates may be created, for example, as described herein.

At S360, when it is determined that the expense report templates match the evidencing templates, a report is generated. The report indicates each expense item indicated in a template used for the search and includes the evidencing electronic documents found during the search. The report may further include the created templates for the indicated expense items.

As a non-limiting example, an expense report indicates transaction parameters including an amount spent of USD 1000 in August 2016, with a description "accommodations." A template including these transaction parameters is created for the expense report and utilized to search for 10 invoices for purchases of accommodations made in August 2016. The invoices illustrate transactions totaling USD 1000. The amount and the description of the expense report template is compared to the total amount and the descriptions of the invoices. Since the total amount of the invoices is equal to the amount of the expense report template and the description for each of the invoices matches the description of the expense report template, it is determined that the expense items in the expense report match the found invoices. A report indicating the expense items and including the matching invoices is generated.

Figure 4:
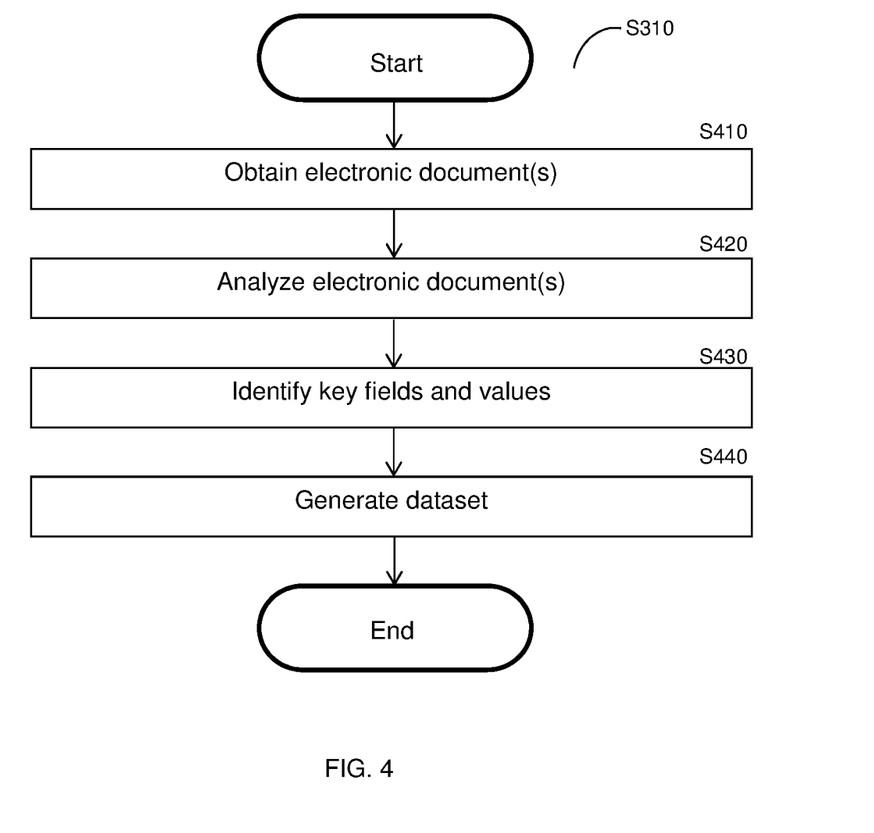
FIG. 4 is a flowchart illustrating a method for creating a dataset based on at least one electronic document according to an embodiment.

FIG. 4 is an example flowchart S310 illustrating a method for creating a dataset based on an electronic document according to an embodiment.

At S410, the electronic document is obtained. Obtaining the electronic document may include, but is not limited to, receiving the electronic document (e.g., receiving a scanned image) or retrieving the electronic document (e.g., retrieving the electronic document from a consumer enterprise system, a merchant enterprise system, or a database).

At S420, the electronic document is analyzed. The analysis may include, but is not limited to, using optical character recognition (OCR) to determine characters in the electronic document.

At S430, based on the analysis, key fields and values in the electronic document are identified. The key field may include, but are not limited to, merchant's name and address, date, currency, good or service sold, a transaction identifier, an invoice number, and so on. An electronic document may include unnecessary details that would not be considered to be key values. As an example, a logo of the merchant may not be required and, thus, is not a key value. In an embodiment, a list of key fields may be predefined, and pieces of data that may match the key fields are extracted. Then, a cleaning process is performed to ensure that the information is accurately presented. For example, if the OCR would result in a data presented as "1211212005", the cleaning process will convert this data to Dec. 12, 2005. As another example, if a name is presented as "Mo$den", this will change to "Mosden". The cleaning process may be performed using external information resources, such as dictionaries, calendars, and the like.

In a further embodiment, it is checked if the extracted pieces of data are completed. For example, if the merchant name can be identified but its address is missing, then the key field for the merchant address is incomplete. An attempt to complete the missing key field values is performed. This attempt may include querying external systems and databases, correlation with previously analyzed invoices, or a combination thereof. Examples for external systems and databases may include business directories, Universal Product Code (UPC) databases, parcel delivery and tracking systems, and so on. In an embodiment, S430 results in a complete set of the predefined key fields and their respective values.

At S440, a structured dataset is generated. The generated dataset includes the identified key fields and values.

Figure 5:
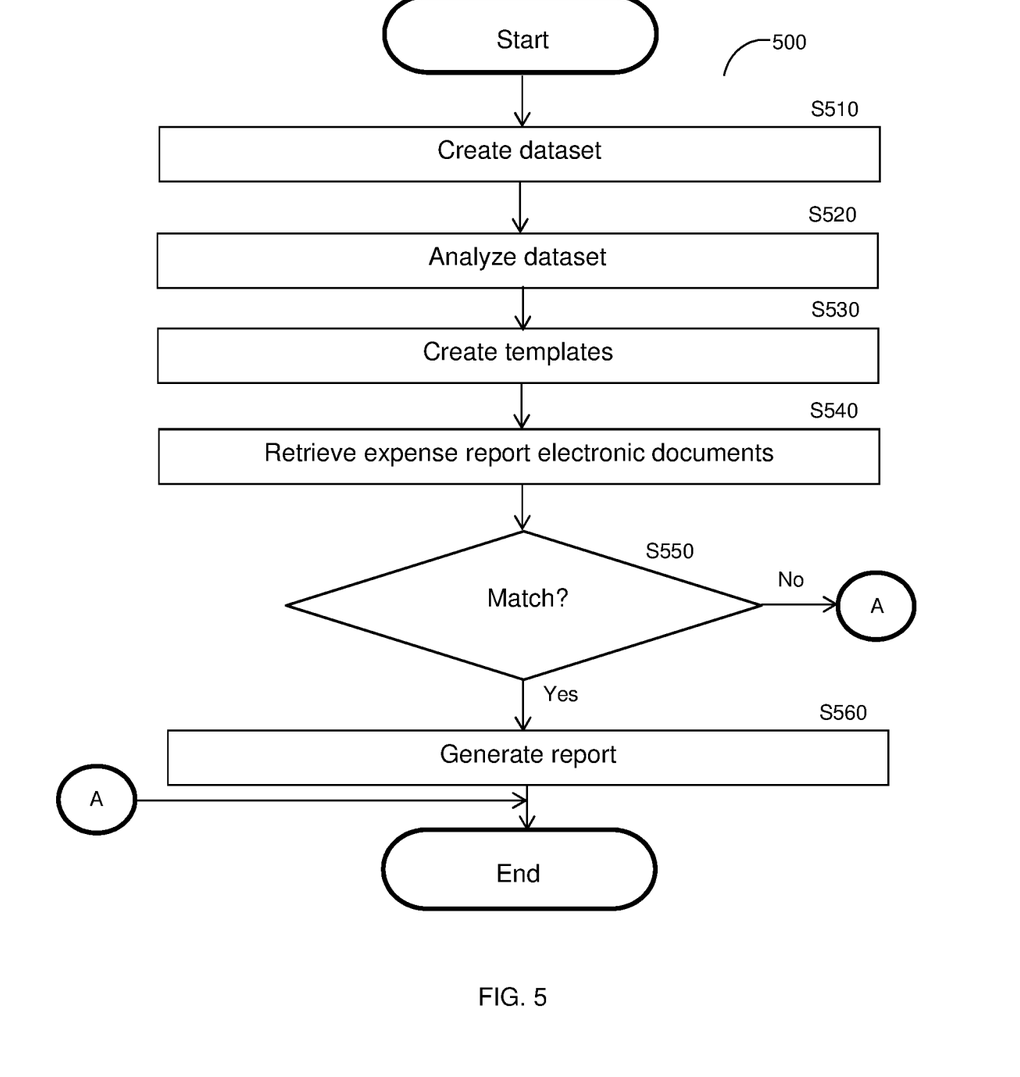
FIG. 5 is a flowchart illustrating a method for reporting based on electronic documents according to another embodiment.

FIG. 5 is an example flowchart 500 illustrating a method for reporting based on electronic documents according to another embodiment. In an embodiment, the method may be performed by a report generator (e.g., the report generator 120). In an example implementation, the method includes reporting expense items indicated in one or more first evidencing electronic documents and in one or more second expense report electronic documents.

At S510, a dataset is created based on each evidencing electronic document including information related to at least one expense item. Each evidencing electronic document may include, but is not limited to, unstructured data, semi-structured data, structured data with structure that is unanticipated or unannounced, or a combination thereof. In an embodiment, S510 may further include analyzing the evidencing electronic documents using optical character recognition (OCR) to determine data in the evidencing electronic documents, identifying key fields in the data, identifying values in the data, or a combination thereof. Creating datasets based on electronic documents is described further herein above with respect to FIG. 4.

In some implementations, each evidencing electronic document may be associated with a user such that data of the evidencing electronic documents may be compared to data of expense reports associated with the user. To this end, each evidencing electronic document may include a user identifier.

At S520, the evidencing datasets are analyzed. In an embodiment, analyzing each evidencing dataset may include, but is not limited to, determining transaction parameters such as, but not limited to, at least one entity identifier (e.g., a consumer enterprise identifier, a merchant enterprise identifier, or both), information related to the transaction (e.g., a date, a time, a price, a type of good or service sold, etc.), or both. In a further embodiment, analyzing the evidencing dataset may also include identifying the transaction based on the evidencing dataset. The analysis may further include identifying the user identifier of each evidencing electronic document.

At S530, one or more templates is created based on each evidencing dataset. Each template may be, but is not limited to, a data structure including a plurality of fields. The fields may include the identified transaction parameters. The fields may be predefined. Each template may include transaction parameters indicating a distinct expense item illustrated in an evidencing electronic document.

Creating templates from electronic documents allows for faster processing due to the structured nature of the created templates. For example, query and manipulation operations may be performed more efficiently on structured datasets than on datasets lacking such structure. Further, organizing information from electronic documents into structured datasets, the amount of storage required for saving information contained in electronic documents may be significantly reduced. Electronic documents are often images that require more storage space than datasets containing the same information. For example, datasets representing data from 100,000 image electronic documents can be saved as data records in a text file. A size of such a text file would be significantly less than the size of the 100,000 images.

At S540, one or more expense report electronic documents are retrieved based on the templates of the evidencing electronic documents. In an embodiment, S540 includes searching, based on transaction parameters in the evidencing templates, in one or more web sources. Alternatively or collectively, the search may be based on the user identifier of the evidencing electronic documents such that each retrieved expense report electronic document is associated with the same user.

In an embodiment, S540 may further include determining which templates to be utilized for the search. Specifically, only some of the templates may be utilized when, for example, one or more of the templates indicates a previously utilized expense item. For example, if an employee has previously reported the expense item, that expense item may be excluded from the search such that it is not reported twice. The excluded templates may be determined by, e.g., comparing the templates to previously created templates, where each compared previously created template includes metadata marking the expense item of the template as previously utilized.

At S550, the evidencing templates utilized for the search are compared to data of the retrieved expense report electronic documents to determine whether the respective expense items indicated in the expense report electronic documents match the expense report electronic documents and, if so, execution continues with S560; otherwise, execution terminates. In an embodiment, the comparison may be based on a predetermined threshold with respect to one or more transaction parameters. The comparison may be further based on one or more matching rules defining matching parameters. In an example implementation, the comparison is performed at least with respect to at least the expense amount and expense description values.

In an embodiment, S550 may further include creating a template for each expense item indicated in the retrieved expense report electronic document and comparing transaction parameters in fields of the expense item templates to transaction parameters in corresponding fields of the evidencing templates. The templates may be created, for example, as described herein.

At S560, when it is determined that the expense items indicated in the expense report electronic documents match the expense report electronic documents, a report is generated. The report indicates each expense item indicated in a template used for the search and includes the evidencing electronic documents found during the search. The report may further include the created templates for the indicated expense items.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for reporting based on a comparison of templates representative of a first electronic document and at least one second electronic document, comprising:
   analyzing, by a processor, the first electronic document to determine at least one transaction parameter for each of at least one expense item, the first electronic document indicating the at least one expense item, wherein the first electronic document is an image showing a value-added tax (VAT) reclaim request and consists of unstructured data that is without a format that is recognizable by the processor, wherein determining the at least one transaction parameter further comprises:
      identifying, by the processor, in the first electronic document, at least one key field and at least one value;
      creating, by the processor, based on the first electronic document, a dataset, wherein the created dataset includes the at least one key field and the at least one value; and
      analyzing, by the processor, the created dataset, wherein the at least one transaction parameter is determined based on the analysis;
   creating, by the processor, a first template for the first electronic document, wherein the first template is a structured dataset including the unstructured data extracted from the first electronic document and reorganized to form the at first template, and includes the determined at least one transaction parameter for the each of at least one expense item including one of at least a transaction amount and a transaction description;
   creating, by the processor, a second template for each of the at least one second electronic document,
      wherein the at east one second electronic document consists of unstructured data that is without a format that is recognizable by a processor and is an image showing at least one of: an invoice, a receipt and a purchase number record used as evidence to support the first electronic document, and
      wherein each of the second template is a structured dataset including the unstructured data extracted from the respective at least one second electronic document and reorganized to form the at least one second template;

searching, by the processor, for the at least one second template based on the determined at least one transaction parameter reorganized as the structured dataset in the at least one first template;

comparing, by the processor, at least one portion of the first template to a corresponding portion of the at least one second template, wherein the at least one second electronic document matches the at least one expense item when the at least one portion of the first template matches the at least one portion of the at least one second template above a predetermined threshold with respect to the determined at least one transaction parameter; and generating, by the processor, a report when the at least one second template matches the at least one expense item, wherein the report indicates the at least one expense item and includes the at least one second electronic document.

2. The method of claim 1, wherein identifying the at least one key field and the at least one value further comprises:
analyzing, by the processor, the first electronic document to determine data in the first electronic document; and
extracting, by the processor, based on a predetermined list of key fields, at least a portion of the determined data, wherein the at least a portion of the determined data matches at least one key field of the predetermined list of key fields.

3. The method of claim 2, wherein analyzing the first electronic document further comprises:
performing, by the processor, optical character recognition on the first electronic document.

4. The method of claim 3, further comprising:
performing, by the processor, a cleaning process on the extracted at least a portion of the determined data.

5. The method of claim 1, wherein the first electronic document is an expense report electronic document.

6. The method of claim 1, wherein the at least one transaction parameter includes an expense amount and an expense description, and wherein the at least one portion of the first template matches the at least one portion of the at least one second template when the expense amount equals a total amount indicated in the at least one second electronic document.

7. The method of claim 1, further comprising:
marking the at least one expense item indicated in the generated report as a utilized expense item;
identifying previously utilized expense items based on the mark;
excluding the identified previously utilized expense items from a subsequent search; and
excluding the at least one second template corresponding to the identified previously utilized expense items from the subsequent search.

8. A non-transitory computer readable medium having stored thereon instructions for causing a processing circuitry to perform a process for reporting based on a comparison of templates representative of a first electronic document and at least one second electronic document, the process comprising:
analyzing the first electronic document to determine at least one transaction parameter for each of at least one expense item, the first electronic document indicating the at least one expense item, wherein the first electronic document is an image showing a value-added tax (VAT) reclaim request and consists of unstructured that is without a format that is recognizable by the processor, wherein determining the at least one transaction parameter further comprises:
identifying, in the first electronic document, at least one key field and at least one value;
creating, based on the first electronic document, a dataset, wherein the created dataset includes the at least one key field and the at least one value; and
analyzing the created dataset, wherein the at least one transaction parameter is determined based on the analysis;

creating a first template for the first electronic document, wherein the first template is a structured dataset including the unstructured data extracted from the first electronic document and reorganized to form the first template, and includes the determined at least one transaction parameter for the each of at least one expense item including one of at least a transaction amount and a transaction description;

creating a second template for each of the at least one second electronic document,
wherein the at least one second electronic document consists of unstructured data that is without a format that is recognizable by a processor and is an image showing a least one of: an invoice, a receipt, and a purchase number record used as evidence to support the first electronic document, and
wherein each of the second template is a structured dataset including the unstructured data extracted from the respective at least one second electronic document and reorganized to form the at least one second template;

searching for the at least one second template based on the determined at least one transaction parameter reorganized as the structured dataset in the template;

comparing at least one portion of the first template to a corresponding portion of the at least one second template, wherein the at least one second electronic document matches the at least one expense item when the at least one portion of the first template matches the at least one portion of the at least one second template above a predetermined threshold with respect to the determined at least one transaction parameter; and generating a report when the at least one second template matches the at least one expense item wherein the report indicates the at least one expense item and includes the at least one second electronic document.

9. A system for reporting based on a comparison of templates representative of a first electronic document and at least one second electronic document, comprising:
a processing circuitry; and
a memory, the memory containing instructions that, when executed by the processing circuitry, configure the system to:
analyze the first electronic document to determine at least one transaction parameter for each of at least one expense item, the first electronic document indicating the at least one expense item, wherein the first electronic document is an image showing a value-added tax (VAT) reclaim request and consists of unstructured data that is without a format that is recognizable by the processor, wherein determining the at least one transaction parameter further comprises:
identifying, by the system, in the first electronic document, at least one key field and at least one value;

creating, by the system, based on the first electronic document, a dataset, wherein the created dataset includes the at least one key field and the at least one value; and analyzing, by the system, the created dataset, wherein the at least one transaction parameter is determined based on the analysis;

create a first template for the first electronic document, wherein the first template is a structured dataset including the unstructured data extracted from the first electronic document and reorganized to form the first template, and includes the determined at least one transaction parameter for the each of at least one expense item including one of at least a transaction amount and a transaction description;

create a second template for each of the at least one second electronic document, wherein the at least one second electronic document consists of unstructured data that is without a format that is recognizable by a processor and is an image showing at least one of: an invoice, a receipt, and a purchase number record used as evidence to support the first electronic document, and wherein each of the second template is a structured dataset including the unstructured data extracted from the respective at least one second electronic document and reorganized to form the at least one second template;

search for the at least one second template based on the determined at least one transaction parameter reorganized as the structured dataset in the at least one first template;

comparing, by the processor, at least one portion of the first template to a corresponding portion of the at least one second template, wherein the at least one second electronic document matches the at least one expense item when the at least one portion of the first template matches the at least one portion of the at least one second template above a predetermined threshold with respect to the determined at least one transaction parameter; and generate a report when the at least one second template matches the at least one expense, wherein the report indicates the at least one expense item and includes the at least one second electronic document.

10. The system of claim 9, wherein the system is further configured to:

analyze the first electronic document to determine data in the first electronic document; and extract, based on a predetermined list of key fields, at least a portion of the determined data, wherein the at least a portion of the determined data matches at least one key field of the predetermined list of key fields.

11. The system of claim 10, wherein the system is further configured to:

perform optical character recognition on the first electronic document.

12. The system of claim 11, wherein the system is further configured to:

perform a cleaning process on the extracted at least a portion of the determined data.

13. The system of claim 11, wherein the system is further configured to:

check if each piece of data of the extracted at least a portion of the determined data is completed; and for each piece of data that is not completed, perform at least one of: querying at least one external source, and correlating the determined data with data of at least one previously analyzed electronic document.

14. The system of claim 9, wherein the system is further configured to determine that the value-added tax (VAT) reclaim request is verified by comparing the first template and the second template.

15. The method of claim 9, wherein the structured dataset includes organized information from the first electronic document and the identified at least one key field and at least one value.

16. The system of claim 9, wherein the system is further configured to:

mark the at least one expense item indicated in the generated report as a utilized expense item;

identify previously utilized expense items based on the mark;

exclude the identified previously utilized expense items from a subsequent search; and exclude the at least one second template corresponding to the identified previously utilized expense items from the subsequent search.

* * * * *